(12) United States Patent
Choi

(10) Patent No.: US 11,892,895 B2
(45) Date of Patent: Feb. 6, 2024

(54) DISPLAY DEVICE

(71) Applicant: SILICON WORKS CO., LTD., Daejeon (KR)

(72) Inventor: Jung Min Choi, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/872,905

(22) Filed: Jul. 25, 2022

(65) Prior Publication Data

US 2022/0357790 A1 Nov. 10, 2022

Related U.S. Application Data

(63) Continuation of application No. 17/082,854, filed on Oct. 28, 2020, now Pat. No. 11,422,612.

(30) Foreign Application Priority Data

Nov. 18, 2019 (KR) .................. 10-2019-0147414

(51) Int. Cl.
*G09G 3/20* (2006.01)
*G06F 1/3234* (2019.01)

(52) U.S. Cl.
CPC ............ *G06F 1/3265* (2013.01); *G09G 3/20* (2013.01); *G09G 2310/08* (2013.01); *G09G 2330/023* (2013.01); *G09G 2330/028* (2013.01)

(58) Field of Classification Search
None
See application file for complete search history.

(56) References Cited

U.S. PATENT DOCUMENTS

| | | | |
|---|---|---|---|
| 9,285,912 B2 | 3/2016 | Cho et al. | |
| 9,639,198 B2 | 5/2017 | Munechika | |
| 10,712,853 B2 | 7/2020 | Hwang et al. | |
| 11,422,612 B2* | 8/2022 | Choi | G06F 3/04166 |
| 2014/0184543 A1 | 7/2014 | Kim et al. | |
| 2014/0204041 A1* | 7/2014 | Munechika | G06F 3/04166 345/212 |
| 2015/0346887 A1 | 12/2015 | Cho et al. | |
| 2016/0147371 A1 | 5/2016 | Jin et al. | |
| 2017/0038894 A1 | 2/2017 | Jeong et al. | |
| 2017/0102824 A1* | 4/2017 | Kang | G06F 3/04184 |
| 2019/0129565 A1 | 5/2019 | Hwang et al. | |
| 2019/0204944 A1 | 7/2019 | Jun et al. | |

FOREIGN PATENT DOCUMENTS

| | | |
|---|---|---|
| JP | 6057462 B2 | 1/2017 |
| KR | 10-1615813 B1 | 5/2016 |
| KR | 10-2019-0047553 A | 5/2019 |

OTHER PUBLICATIONS

United States Office Action, U.S. Appl. No. 17/082,854, filed Jan. 12, 2022, 15 pages.

* cited by examiner

*Primary Examiner* — Ifedayo B Iluyomade
(74) *Attorney, Agent, or Firm* — ROTHWELL, FIGG, ERNST & MANBECK, P.C.

(57) ABSTRACT

The present disclosure, which relates to a technology for controlling power of a display device, allows reducing power consumption by driving circuits for a display operation and circuits for a touch sensing operation with low power depending on a display operation or a touch sensing operation of a display panel.

16 Claims, 14 Drawing Sheets

DISPLAY DEVICE

CROSS REFERENCE TO RELATED APPLICATION

This application is a continuation of U.S. patent application Ser. No. 17/082,854 filed on Oct. 28, 2020, which claims priority from Republic of Korea Patent Application No. 10-2019-0147414, filed on Nov. 18, 2019, each of which is hereby incorporated by reference in its entirety.

BACKGROUND

1. Field of Technology

The present disclosure relates to a technology for controlling power of a display device.

2. Description of the Prior Art

One of the most important issue regarding electronic apparatuses, including mobile apparatuses, is to reduce power consumption. As electronic apparatuses become downsized and the capacity of their batteries becomes limited, the power consumption needs to be reduced. For this reason, research into the reduction of power consumption is being done. A display device used in almost all electronic apparatuses may be a component where a considerable reduction of power consumption can be made.

A screen of an electronic apparatus may be an area where images are displayed as well as an area where inputs are received. In order that a screen of an electronic apparatus receives inputs, a touch sensing technology for perceiving a touch or the proximity of an external object is used. In an electronic apparatus, a touch panel is positioned in the same plane as that of a display panel, and accordingly, a user may input user operation signals into a touch panel while the user looks at images on a display panel. Such a method of generating user operation signals is remarkably intuitive for users compared with previous other user operation signal input types, such as a mouse input type or a keyboard input type.

In order to perform both a display and a touch sensing, a display device may comprise a panel of an in-cell or on-cell type in which a touch panel and a display panel share some components. In a case when a panel is of an in-cell type or an on-cell type, a display device may adopt a time-sharing method, and may display images in one time section and sense a touch or the proximity of an external object in the other time section.

Meanwhile, in a display device, both a block serving a display and a block serving a touch sensing may operate regardless of time sections. However, the block serving a touch sensing would not need to fully operate when a display device performs a display, and the block serving a display would not need to fully operate when a display device performs a touch sensing. If all the blocks of a display device always fully operate regardless of its operations, unnecessary power would be consumed, and thus, power consumption of a display device may greatly increase.

SUMMARY

In this regard, the present disclosure provides a technology for reducing power consumption of a display device by dynamically controlling power supplies to internal circuits depending on operations of a display device.

An aspect of the present disclosure is to provide a technology of driving circuits for a display operation or circuits for a touch sensing operation with low power depending on a display operation or a touch sensing operation of a display panel.

Another aspect of the present disclosure is to provide a technology of driving circuits for a display operation or circuits for a touch sensing operation with low power according to a touch synchronization signal indicating a display operation or a touch sensing operation of a display device or a power synchronization signal indicating a low power operation of a circuit.

To this end, an aspect of the present disclosure provides a display device comprising: a panel to display image data and to sense a touch or the proximity of an external object; a first circuit, for displaying image data, to operate with low power while a touch or the proximity of an external object is sensed; a second circuit, for sensing a touch or the proximity of an external object, to operate with low power while image data is displayed; and a third circuit to generate at least one control signal for controlling low power operations of the first circuit and the second circuit and to transmit the control signals to the first circuit and the second circuit.

In the display device, the control signals may comprise a touch synchronization signal to indicate a first time section where image data is displayed on the panel and a second time section where a touch or the proximity of an external object is sensed. The first circuit may operate with low power in the second time section and the second circuit may operate with low power in the first time section according to the touch synchronization signal.

In the display device, the control signals may comprise a power synchronization signal to indicate low power operations of the first circuit and the second circuit.

In the display device, the power synchronization signal may be generated separately from the touch synchronization signal and indicate timings different from those indicated by the touch synchronization signal.

In the display device, the first circuit and the second circuit may be included in a power management integrated circuit (PMIC).

In the display device, the second circuit may comprise a touch modulation integrated circuit (TMIC).

In the display device, the third circuit may comprise a microcontroller (MCU) or a timing controller (TCON).

The display device may further comprise a fourth circuit to maintain the operation of displaying image data while the second circuit operates with low power or to maintain the operation of sensing a touch or the proximity of an external object while the first circuit operates with low power.

In the display device, the first circuit and the second circuit may respectively receive a shared voltage used in common. A shared voltage may have a first voltage level while a touch or the proximity of an external object is sensed and have a second voltage level higher than the first voltage level while image data is displayed.

In the display device, the first circuit and the second circuit may be included to a source readout integrated circuit (SRIC).

In the display device, the first circuit and the second circuit may be included in a microcontroller, a touch modulation integrated circuit, or a source readout integrated circuit, and the third circuit may comprise a timing controller.

In the display device, the first circuit may comprise a first part of a source driver circuit or a first part of a power management integrated circuit operating in order to display image data, the second circuit may comprise a second part of a readout integrated circuit or a second part of a power management integrated circuit operating in order to sense a touch or the proximity of an external object, and the third circuit may comprise a microcontroller or a timing controller.

In the display device, the first circuit may comprise a first part of a source driver circuit or a first part of a microcontroller operating in order to display image data, the second circuit may comprise a second part of a readout integrated circuit or a second part of a microcontroller operating in order to sense a touch or the proximity of an external object, and the third circuit may comprise a timing controller.

In the display device, the third circuit may comprise a first combined circuit in which a microcontroller and a timing controller are integrated.

In the display device, the first circuit and the second circuit may be included in a second combined circuit in which a touch modulation integrated circuit and a power management integrated circuit are integrated.

Another aspect of the present disclosure provides a method of operating a display device comprising steps of: generating control signals to control low power operations of a first circuit to operate for displaying image data and a second circuit to operate for sensing a touch or the proximity of an external object; transmitting the control signals to the first circuit and the second circuit; operating the first circuit with low power while a touch or the proximity of an external object is sensed; and operating the second circuit with low power while image data is displayed.

In the method, the control signals may comprise a touch synchronization signal to indicate a first time section where image data is displayed on the panel and a second time section where a touch or the proximity of an external object is sensed. The first circuit may operate with low power in the second time section according to the touch synchronization signal and the second circuit may operate with low power in the first time section according to the touch synchronization signal.

In the method, the control signals may comprise a power synchronization signal to indicate low power operations of the first circuit and the second circuit. The power synchronization signal may be generated separately from the touch synchronization signal and have timings different from those of the touch synchronization signal.

As described above, the present disclosure allows reducing power consumption in a display device by driving circuits for the display operation with low power during the touch sensing operation. In addition, the present disclosure allows reducing power consumption in a display device by driving circuits for the touch sensing operation with low power during the display operation.

DETAILED DESCRIPTION

Figure 1:
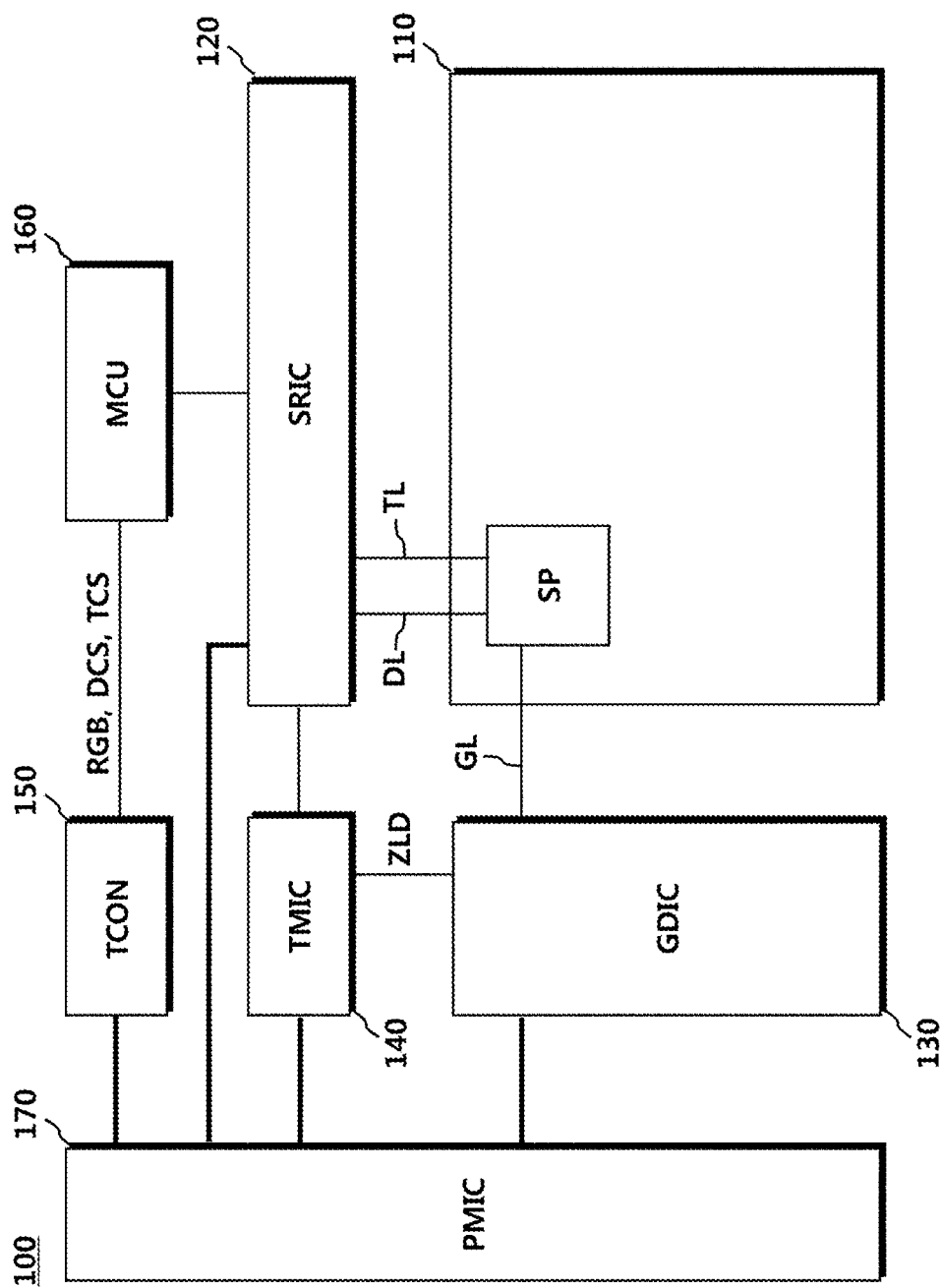
FIG. 1 is a configuration diagram of a display device according to an embodiment of the present disclosure.

FIG. 1 is a configuration diagram of a display device according to an embodiment of the present disclosure.

Referring to FIG. 1, a display device 100 may comprise a panel 110, a source readout integrated circuit (SRIC) 120, a gate driving circuit (GDIC) (130), a touch modulation integrated circuit (TMIC) 140, a timing controller (TCON) 150, a microcontroller (MCU) 160, and a power management integrated circuit (PMIC) 170.

On the panel 110, a plurality of data lines DL and a plurality of gate lines GL may be disposed, and a plurality of pixels may also be disposed. A pixel may comprise a plurality of sub-pixels SP. Here, sub-pixels may be a red (R) sub-pixel, a green (G) sub-pixel, a blue (B) sub-pixel, or a white (W) sub-pixel. A pixel may comprise RGB sub-pixels SP, RGBG sub-pixels SP, or RGBW sub-pixels. For the convenience of description, the description will be made supposing that a pixel comprises RGB sub-pixels, hereinafter.

A source readout integrated circuit 120, a gate driving circuit 130, and a timing controller 150 are to generate signals for displaying images on the panel.

The source readout integrated circuit 120 may comprise a source driver therein. The source driver may supply a data voltage to a sub-pixel through a data line. A data voltage supplied through a data line may be supplied to a sub-pixel according to a gate driving signal.

In addition, the source readout integrated circuit 120 may comprise a readout integrated circuit (ROIC) therein. The readout integrated circuit may be included in a source readout integrated circuit 120 together with the source driver. The readout integrated circuit may sense a touch by driving electrodes around a sub-pixel SP. The source readout integrated circuit 120 may drive an electrode by a driving signal transmitted through a touch line TL and receive an analog signal from the electrode.

A source readout integrated circuit 120 may be connected to a bonding pad of a display panel 110 in a tape automated bonding (TAB) type or a chip-on-glass (COG) type, directly formed on a display panel 110, or integrated on a display panel 110 depending on cases. In addition, a data driving device 120 may be formed in a chip-on-film (COF) type.

The gate driving device 130 may supply a turn-on voltage or a turn-off voltage as a gate driving signal through a gate line GL. When a turn-on voltage as a gate driving signal is supplied to a sub-pixel SP, the sub-pixel SP is connected with a data line DL. When a turn-off voltage as a gate driving signal is supplied to the sub-pixel SP, the sub-pixel is disconnected from the data line DL.

The touch modulation circuit 140 may generate a zero load driving signal ZLD and transmit this signal to the gate driving circuit 130 in order to reduce an effect of parasitic capacitance of a touch sensor on a result of sensing. A zero load driving signal ZLD may have the same phase as that of a driving signal for driving a touch sensor. If a zero load driving signal ZLD and a driving signal are applied respectively to both sides of a parasitic capacitor, the quantity of electric charges charged in the parasitic capacitor becomes 0 and the parasitic capacitance disappears.

The timing controller 150 may supply control signals to the gate driving circuit 130 and the microcontroller 160. For example, the timing controller 150 may transmit a gate control signal to initiate a scan to the gate driving circuit 130, output image data RGB to the microcontroller 160, transmit a data control signal DCS, to control the source readout integrated circuit 120 to supply a data voltage to each sub-pixel SP, to the microcontroller 160, and transmit a touch control signal TCS, to control the source readout integrated circuit 120 to drive an electrode of each sub-pixel SP so as to sense a touch, to the microcontroller 160.

The microcontroller 160 may exchange data with the source readout integrated circuit 120. The microcontroller 160 may transmit, to the source readout integrated circuit 120, control data to control the source readout integrated circuit 120 and a clock to synchronize image data RGB and data applied to the panel 110. The source readout integrated circuit 120 may generate sensing data from a touch sensor, that senses a touch or the proximity of an external object, and transmit the sensing data to the microcontroller 160.

The microcontroller 160 and the source readout integrated circuit 120 may communicate based on a serial peripheral interface (SPI) method or an inter-integrated circuit (I2C) method. In the SPI method or the I2C method, main agents of communication may operate as a master and a slave. The microcontroller 160 may operate as a master and the source readout integrated circuit 120 may operate as a slave. There may be a plurality of source readout integrated circuits 120, and each of the source readout integrated circuits 120 may operate as a slave for the microcontroller 160.

The power management integrated circuit 170 may supply power to the panel 110, the source readout integrated circuit 120, the gate driving circuit 130, the touch modulation integrated circuit 140, the timing controller 150, and the microcontroller 160. The power management integrated circuit 170 may supply power by transmitting driving voltages through power lines. Driving voltages having different voltage values may be applied to the respective circuits. The power management integrated circuit 170 may act as a power source for internal circuits of the display device 100.

Figure 2:
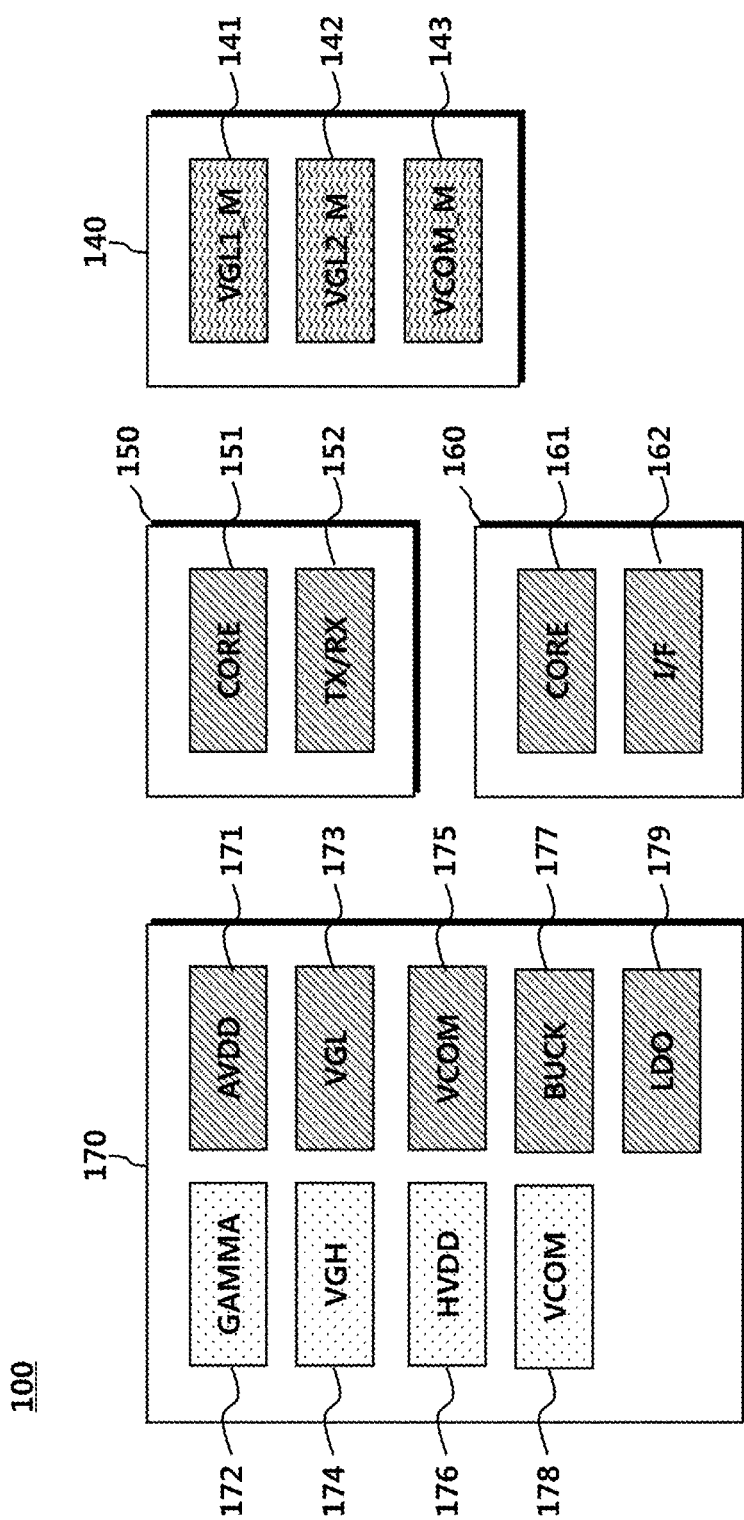
FIG. 2 is a block diagram showing display related circuits and touch sensing related circuits of a display device according to an embodiment.

FIG. 2 is a block diagram showing display related circuits and touch sensing related circuits of a display device according to an embodiment.

Referring to FIG. 2, the display device 100 may comprise display related circuits, touch sensing related circuits, and common circuits. Although the circuits comprised in the display device 100 may be classified into the display related circuits, the touch sensing related circuits, and the common circuits, the classification of the circuits is not limited to this, but there may be other circuits belonging to other categories. In this figure, the display related circuits are indicated by a pattern of dots, the touch sensing related circuits are indicated by a pattern of waves, and the common circuits are indicated by a pattern of diagonal lines.

The display related circuits may be circuits involved in an operation in which the display device 100 displays image data. The display related circuits may be circuits necessarily operating for outputting image data.

For example, a display related circuit may be a source driver circuit. The source driver circuit may output data voltages corresponding to image data in order to display image data on the panel. The source driver circuit needs to operate for a display operation of the display device 100.

An entire functional circuit for performing one function may be a display related circuit. Or, display related circuits may comprise some parts of a functional circuit.

For example, the source driver circuit is a functional circuit to output data voltages and the entire source driver circuit may be a display related circuit. On the contrary, the power management integrated circuit 170 may be considered as a functional circuit to perform one function of supplying power, however, only some parts of the power management integrated circuit 170 may be display related circuits. In the power management integrated circuit 170, a second power management integrated circuit 172, a fourth power management integrated circuit 174, a sixth power management integrated circuit 176, and an eighth power management integrated circuit 178 may be display related circuits.

The second power management integrated circuit 172 may generate a gamma voltage corresponding to image data and supply it to a buffer of the source driver. The buffer may supply the gamma voltage to a pixel of the panel. A gamma voltage may have a positive level or a negative level to express a grayscale value.

The fourth power management integrated circuit 174 may generate a high voltage. A high voltage generated by the fourth power management integrated circuit may comprise a gate high voltage VGH applied by the gate driving circuit 130.

The sixth power management integrated circuit 176 may generate a half voltage HVDD to control a gamma voltage and supply it to the buffer of the source driver.

The eighth power management integrated circuit 178 may generate a common voltage VCOM to display image data and supply it to a common electrode of the panel.

Meanwhile, the touch sensing related circuits may be circuits involved in operations in which the display device 100 senses a touch or the proximity of an external object. The touch sensing related circuits may be circuits necessarily operating for a touch sensing.

For example, a touch sensing related circuit may be a touch modulation integrated circuit 140. The touch modulation integrated circuit 140 may generate signals to drive touch sensors, for example touch electrodes, of the panel. The touch modulation integrated circuit 140 needs to operate for the touch sensing operation of the display device 100.

An entire functional circuit performing one function may be a touch sensing related circuit. Or, touch sensing related circuits may comprise only some parts of a functional circuit.

For example, the source readout integrated circuit may be considered as a functional circuit performing one function of driving a panel, however, in the source readout integrated circuit, a readout circuit, excluding the source driver circuit serving a display, may be a touch sensing related circuit. Here, a source readout integrated circuit may comprise a source driver circuit and a readout circuit. On the contrary, the touch modulation integrated circuit 140 is a functional circuit to drive touch sensors or to generate signals, having the same phase as that of touch sensor driving signals, by modulation and to output them. The entire touch modulation integrated circuit 140 may be a touch sensing related circuit. The touch modulation integrated circuit 140 may comprise a first touch modulation integrated circuit 141, a second touch modulation integrated circuit 142, and a third touch modulation integrated circuit 143.

The first touch modulation integrated circuit 141 may generate, as a zero load driving signal ZLD, a first gate low voltage VGL1_M for a first line. The first gate low voltage VGL1_M may be applied to the first line of the panel by the gate driving circuit.

The second touch modulation integrated circuit 142 may generate, as another zero load driving signal ZLD, a second gate low voltage VGL2_M for a second line. The second gate low voltage VGL2_M may be applied to the second line of the panel by the gate driving circuit.

The third touch modulation integrated circuit 143 may generate a driving signal VCOM_M for driving a touch sensor. A driving signal VCOM_M may be transferred to a touch sensor of a touch panel by a readout integrated circuit.

Common circuits may always be involved in all the operations of the display device 100 such as the display of image data or the sensing of a touch or the proximity of an external object. The common circuits may be circuits necessarily operating for the display or the touch sensing.

For example, the common circuits may be the timing controller 150 and the microcontroller 160. Since the timing controller 150 generates and transmits control signals required for the display and the touch sensing operations of the display device 100, a core 151 and a transmitting and receiving circuit (TX/RX) 152 of the timing controller 150 may be common circuits. In addition, the microcontroller 160 may also be a common circuit. Since the microcontroller 160 controls the source readout integrated circuit involved in the display and the touch sensing operations of the display device 100, a core 161 and an interface circuit (I/F) 162 of the microcontroller may common circuits.

An entire functional circuit performing one function may be a common circuit. Or, common circuits may comprise only some parts of a functional circuit.

For example, the timing controller 150 and the microcontroller 160 are functional circuits for control and the entire timing controller 150 and the entire microcontroller 160 may be common circuits. On the contrary, the power management integrated circuit 170 may be considered as a functional circuit to perform one function of supplying power, however, some parts of the power management integrated circuit 170 may be common circuits. In the power management integrated circuit 170, a first power management integrated circuit 171, a third power management integrated circuit 173, a fifth power management integrated circuit 175, a seventh power management integrated circuit 177, and a ninth power management integrated circuit 179 may be common circuits.

The first power management integrated circuit 171 may generate an analog voltage AVDD and supply it to a buffer of the source driver so that the source driver may output a gamma voltage.

The third power management integrated circuit 173 may generate a low voltage. A low voltage generated by the third power management integrated circuit 173 may comprise a gate low voltage VGL applied by the gate driving circuit 130.

The fifth power management integrated circuit 175 may generate common voltages VCOM to be supplied to common electrodes regardless of operations of the display device 100.

The seventh power management integrated circuit 177 may comprise a step down converter or a buck converter (BUCK) to convert a voltage such that an output voltage is lower than an input voltage.

The ninth power management integrated circuit 179 may comprise a low drop out (LDO) regulator to convert a voltage such that an output voltage is lower than an input voltage, particularly in a case when a difference between an output voltage and an input voltage is small.

Figure 3:
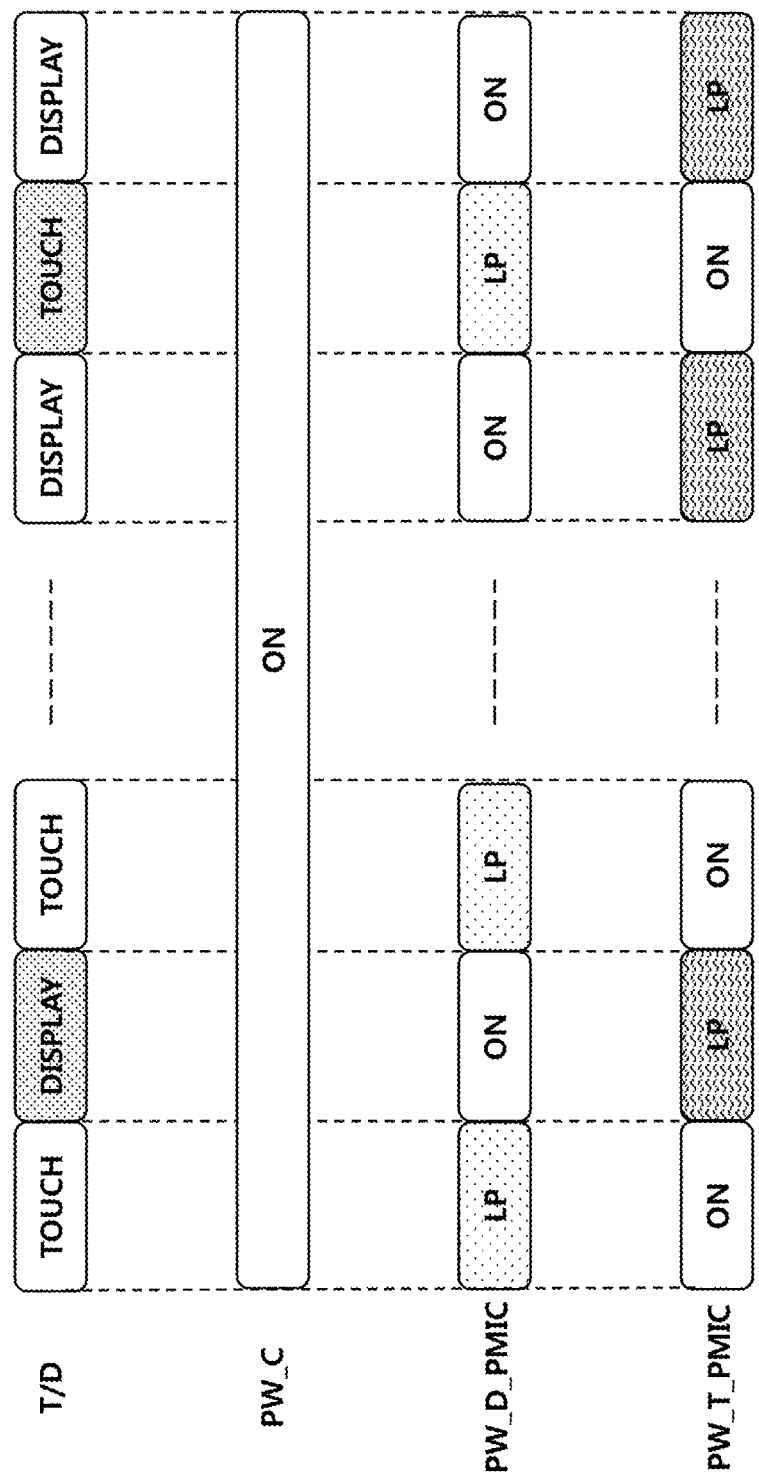
FIG. 3 is a diagram showing power states of display related circuits in a power management integrated circuit, of touch sensing related circuits in a power management integrated circuit, and of common circuits according to an embodiment.

FIG. 3 is a diagram showing power states of display related circuits in a power management integrated circuit, of touch sensing related circuits in a power management integrated circuit, and of common circuits according to an embodiment.

Referring to FIG. 3, in a case when the display and the touch sensing of the display device are performed in different time sections, operations and power consumption of internal circuits of the display device are different depending on the operations of the display or the touch sensing.

Internal circuits of the display device may consume required power in a normal condition while performing functions for the display operation or the touch sensing operation of the display device. Circuits in this state may be defined as being in a normal mode. In this figure, the circuits' consuming required power in a normal mode is indicated by ON.

On the contrary, in a case when an operation of the display device is irrelevant to the functions of the circuits, the circuits do not perform their functions, and thus, may consume the least amount of power. The circuits in this state may be considered to be on standby in order to perform their functions when required. Circuits in such a low power consumption state may be defined as being in a standby mode. In this figure, the circuits' consuming low power in a standby mode is indicated by LP (low power).

The operation time of the display device may be divided into multiple time sections according to timings indicated by a touch synchronization signal TSYNC and the display device may alternately perform the display operation and the touch sensing operation in the time sections. In this figure, T/D indicates the alternation of the display operation and the touch sensing operation.

Common circuits may always be in a normal mode regardless of the operations, such as the display or the touch sensing, of the display device, and thus, may always consume required power. In this figure, power consumption of the common circuits is indicated by PW_C.

Display related circuits in the power management integrated circuit 170 may be in the standby mode and consume low power while the display device performs the touch sensing operation. These display related circuits in the power management integrated circuit 170 may be in the normal mode and fully consume required power while the display device performs the display operation. In this figure, power consumption of the display related circuits in the power management integrated circuit 170 is indicated by PW_D_PMIC.

Touch sensing related circuits in the power management integrated circuit 170 may be in the standby mode and consume low power while the display device performs the display operation. These touch sensing related circuits in the power management integrated circuit 170 may be in the normal mode and fully consume required power while the display device performs the touch sensing operation. In this figure, power consumption of the touch sensing related circuits in the power management integrated circuit 170 is indicated by PW_T_PMIC.

The internal circuits of the display device may differently operate and consume different amounts of power depending on the operations of the display, that is, the display or the touch sensing in which their functions are involved. Although the internal circuits are not in an off-state in which their power is shut off while the display device performs an operation irrelevant to their functions, since they consume the least amount of power while they are on standby, the display device according to an embodiment may consume much lesser amount of power than a display device always fully consuming required power regardless its operations.

Figure 4:
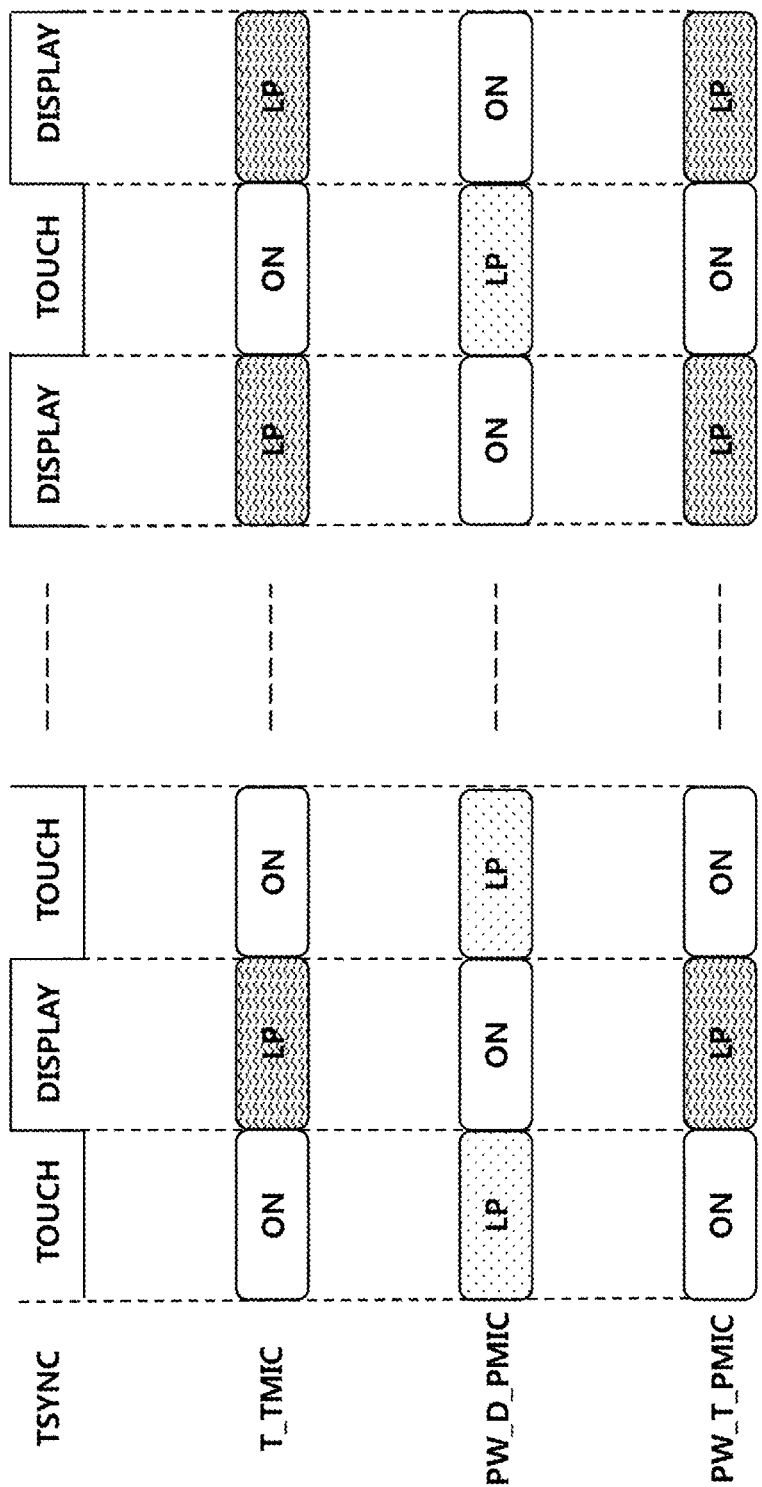
FIG. 4 is a diagram showing a touch synchronization signal and power states of a touch modulation integrated circuit, of display related circuits in a power management integrated circuit, and of touch sensing related circuits in a power management integrated circuit according to an embodiment.

FIG. 4 is a diagram showing a touch synchronization signal and power states of a touch modulation integrated circuit, of display related circuits in a power management integrated circuit, and of touch sensing related circuits in a power management integrated circuit according to an embodiment.

Referring to FIG. 4, the display device may perform the display and the touch sensing in different time sections indicated by a touch synchronization signal TSYNC. Since the operation timings of the display device are determined by a touch synchronization signal TSYNC, the operations and power consumption of the internal circuits of the display device may vary according to a touch synchronization signal TSYNC.

A touch synchronization signal TSYNC may have a waveform indicating the timings of the display operation and the touch sensing operation of the display device. A touch synchronization signal TSYNC, which is a pulse width modulation (PWM) signal, may indicate, by its different levels, a display time section where the display device performs the display and a touch sensing time section where the display device performs the touch sensing. For example, a touch synchronization signal TSYNC may indicate the display time section by a second level, for example a high voltage level, and the touch sensing time section by a first level, for example a low voltage level.

A touch synchronization signal TSYNC may be generated in the timing controller or the microcontroller. A touch synchronization signal TSYNC may be transmitted to circuits operating with low power in the standby mode, for example, display related circuits or touch sensing related circuits.

The touch modulation integrated circuit 140 may consume low power in the standby mode while the display device performs the display operation. On the contrary, the touch modulation integrated circuit 140 may fully consume required power in the normal mode while the display device performs the touch sensing operation. In this figure, power consumption of the touch modulation integrated circuit 140 is indicated by T_TMIC.

The display device may alternately perform the display operation and the touch sensing operation according to the timings indicated by a touch synchronization signal. In the figure, TSYNC may indicate a waveform of a touch synchronization signal TSYNC. A touch synchronization signal TSYNC may be a PWM signal.

Since the common circuits operate regardless of the operations of the display device, they may always operate in a normal condition and fully consume required power regardless of a touch synchronization signal TSYNC.

The display related circuits of the power management integrated circuit 170 may be in the standby mode and consume low power in the touch sensing time section where the touch synchronization signal TSYNC has the first level. On the contrary, the display related circuits of the power management integrated circuit 170 may be in the normal mode and fully consume required power in the display time section where the touch synchronization signal TSYNC has the second level.

The touch sensing related circuits of the power management integrated circuit 170 may be in the standby mode and consume low power in the display time section where the touch synchronization signal TSYNC has the second level. On the contrary, the touch sensing related circuits of the power management integrated circuit 170 may be in the normal mode and fully consume required power in the touch sensing time section where the touch synchronization signal TSYNC has the first level.

Figure 5:
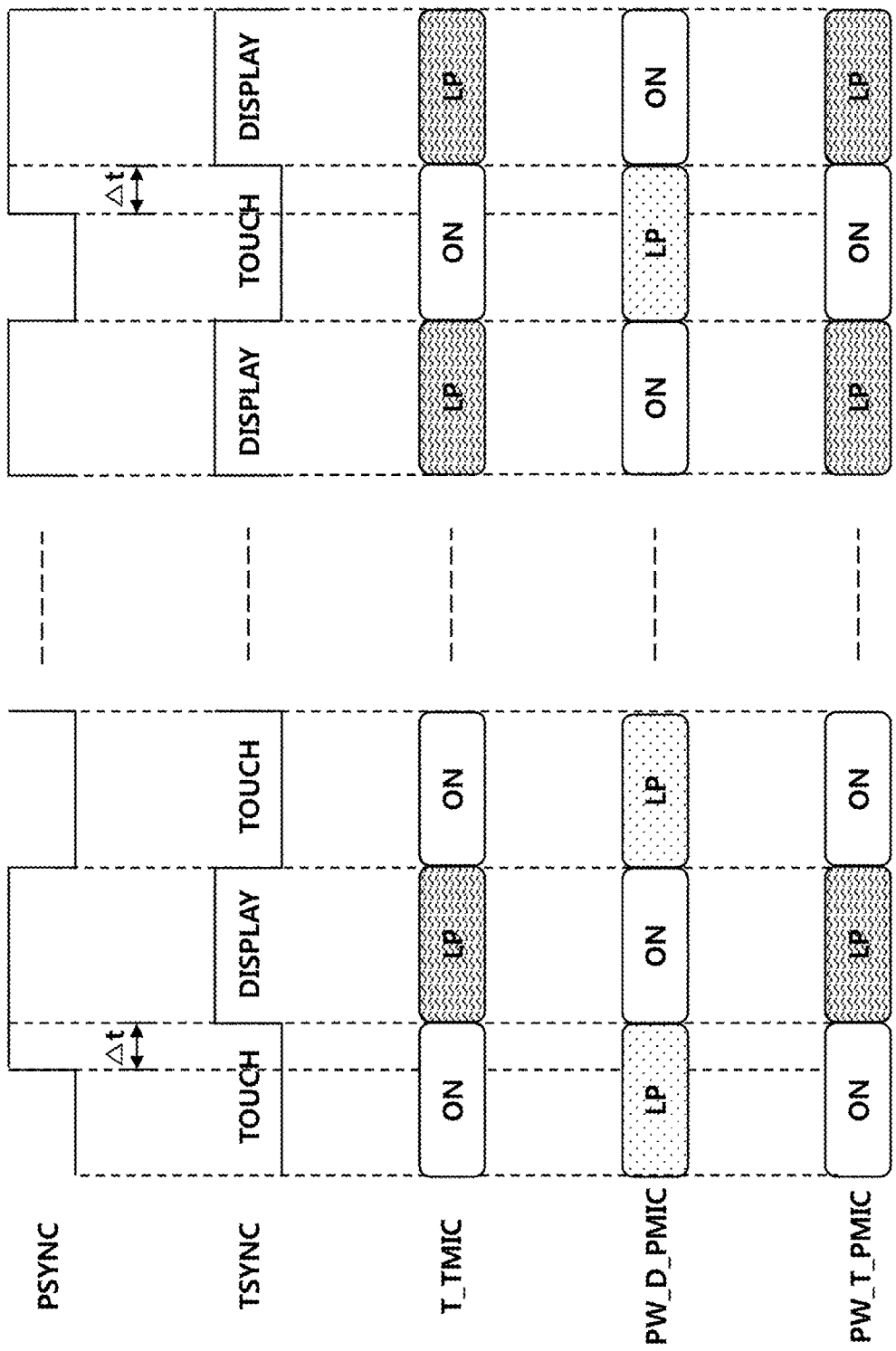
FIG. 5 is a diagram showing a power synchronization signal and a touch synchronization signal and power states of a touch modulation integrated circuit, of display related circuits in a power management integrated circuit, and of touch sensing related circuits in a power management integrated circuit according to an embodiment.

FIG. 5 is a diagram showing a power synchronization signal and a touch synchronization signal and power states of a touch modulation integrated circuit, of display related circuits in a power management integrated circuit, and of touch sensing related circuits in a power management integrated circuit according to an embodiment.

Referring to FIG. 5, the operations and power consumption of the internal circuits of the display device may vary according to a power synchronization signal PSYNC.

A power synchronization signal PSYNC may indicate modes or power consumption states of the internal circuits of the display device. A power synchronization signal PSYNC may be independent of a touch synchronization signal TSYNC, and thus, may be separately generated. Accordingly, a power synchronization signal PSYNC may have different timings from those of a touch synchronization signal TSYNC. For example, in a power synchronization signal PSYNC, a section indicating the standby mode of the touch sensing related circuits may be longer by Δt than the touch sensing time section indicated by a touch synchronization signal TSYNC. Preferably, a power synchronization signal PSYNC and a touch synchronization signal TSYNC may have the same timings. However, a power synchronization signal may have timings and a period different from those of a touch synchronization signal TSYNC in order to advance a timing that the circuits enter the standby mode and extend the duration of the standby mode depending on characteristics of the circuits.

Since a power synchronization signal PSYNC indicates different power consumption of the circuits depending on the display device's operations, which are the display and the touch sensing, a power synchronization signal PSYNC may be identical or similar to a touch synchronization signal TSYNC. A waveform of a power synchronization signal PSYNC may be identical or similar to a period of alternation of the display device's operations.

A power synchronization signal PSYNC may have a waveform indicating the normal mode and the standby mode of the circuits. A power synchronization signal PSYNC, which is a PWM signal, may indicate the normal mode and the standby mode of the circuits with its different levels. For example, a second level, such as a high voltage level, of a power synchronization signal PSYNC may indicate the standby mode of the circuits and a first level, such as a low voltage level, thereof may indicate the normal mode of the circuits. Otherwise, the first level may indicate the standby mode of the circuits and the second level may indicate the normal mode of the circuits.

The circuits may interpret the levels of a power synchronization signal PSYN depending on their functions. For example, the display related circuits may interpret the first level as the standby mode and the second level as the normal mode, whereas the touch sensing related circuits may interpret the first level as the normal mode and the second level as the standby mode.

A power synchronization signal PSYNC may be generated in the timing controller or the microcontroller. A power synchronization signal PSYNC may be transmitted to the circuits operating with low power in the standby mode, for example, the display related circuits or the touch sensing related circuits.

The touch modulation integrated circuit 140 may be in the standby mode and consume low power when a power synchronization signal is in the second level, that is, while the display device performs the display operation. The touch modulation integrated circuit 140 may be in the normal mode and fully consume required power when the power synchronization signal is in the first level, that is, while the display device performs the touch sensing operation.

Since the common circuits operate regardless of the operations of the display device, they may always operate in a normal condition and fully consume required power regardless of a power synchronization signal PSYNC.

The display related circuits of the power management integrated circuit 170 may be in the standby mode and consume low power when the power synchronization signal PSYNC is in the first level, and may be in the normal mode and fully consume required power when the power synchronization signal PSYNC is in the second level.

The touch sensing related circuits of the power management integrated circuit 170 may be in the standby mode and consume low power when the power synchronization signal PSYNC is in the second level, and may be in the normal mode and fully consume required power when the power synchronization signal PSYNC is in the first level.

Figure 6:
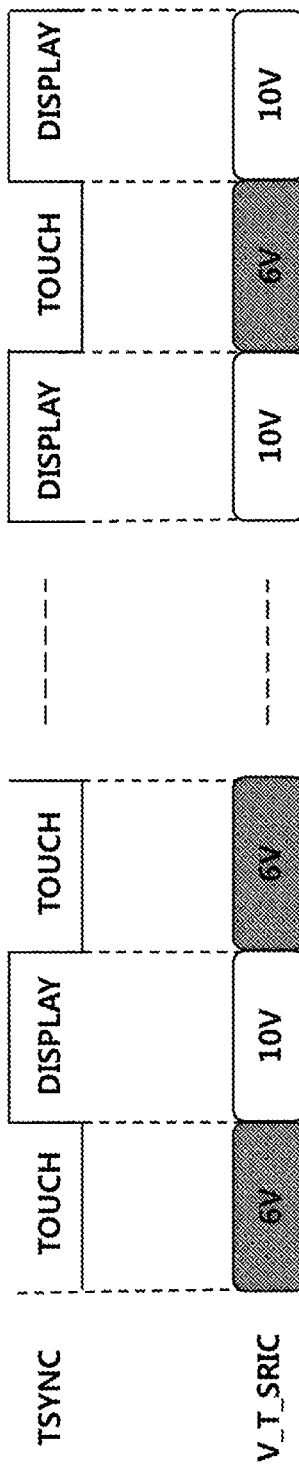
FIG. 6 is a diagram showing a touch synchronization signal and a voltage received by a source readout integrated circuit.

FIG. 6 is a diagram showing a touch synchronization signal and a voltage received by a source readout integrated circuit.

Referring to FIG. 6, a voltage received by the source readout integrated circuit may have different levels depending on the display operation or the touch sensing operation of the display device. In this figure, a voltage received by the source readout integrated circuit is indicated by V_T_SRIC.

The source readout integrated circuit comprises both the display related circuits and the touch sensing related circuits. The source driver circuit may correspond to the display related circuits and the readout circuit may correspond to the touch sensing related circuits. The source readout integrated circuit may receive a shared voltage commonly used in the display related circuits and the touch sensing related circuits. A shared voltage may be generated in the power management integrated circuit and transmitted to the source readout integrated circuit.

Conventionally, a shared voltage received by the source readout integrated circuit may have a uniform level and the level may be suitable for the display related circuits of the source readout integrated circuit to operate. Since, in the source readout integrated circuit, the level of a voltage required by the display related circuits is higher than the level of a voltage required by the touch sensing related circuits, a shared voltage may have a level to be suited for the display related circuits.

For example, the source readout integrated circuit may receive a shared voltage of 10V regardless of the display operation or the touch sensing operation of the display device. Both the source driver circuit, which is a display related circuit, and the readout circuit, which is a touch sensing related circuit, may operate by the shared voltage of 10V.

However, according to an embodiment, a shared voltage received by the source readout integrated circuit may have different levels depending on the display operation or the touch sensing operation of the display device. A first level may be suitable for the display related circuits of the source readout integrated circuit to operate and a second level may be suitable for the touch sensing related circuits of the source readout integrated circuit to operate. Since, in the source readout integrated circuit, the level of a voltage required by the display related circuits is higher than the level of a voltage required by the touch sensing related circuits, the first level may be higher than the second level. In this figure, the first level may be 10V and the second level may be 6V.

The shared voltage may correspond to a touch synchronization signal TSYNC. The shared voltage may have the first level in the section for the display operation of the display device and the second level in the section for the touch sensing operation of the display device.

The source readout integrated circuit may operate with a 10V of shared voltage in the section for the display operation indicated by the touch synchronization signal TSYNC and with a 6V of shared voltage in the section for the touch sensing operation indicated by the touch synchronization signal TSYNC.

As described above, according to an embodiment, a circuit comprising both the display related circuits and the touch sensing related circuits, for example, the source readout integrated circuit may operate with a voltage having a level suitable for the display related circuits in the section for the display operation and with a voltage having a level suitable for the touch sensing related circuits in the section for the touch sensing operation. Such a method allows reducing power consumption compared with a method in which all the circuits use a uniform level of voltage exclusively set for the display related circuits.

Figure 7:
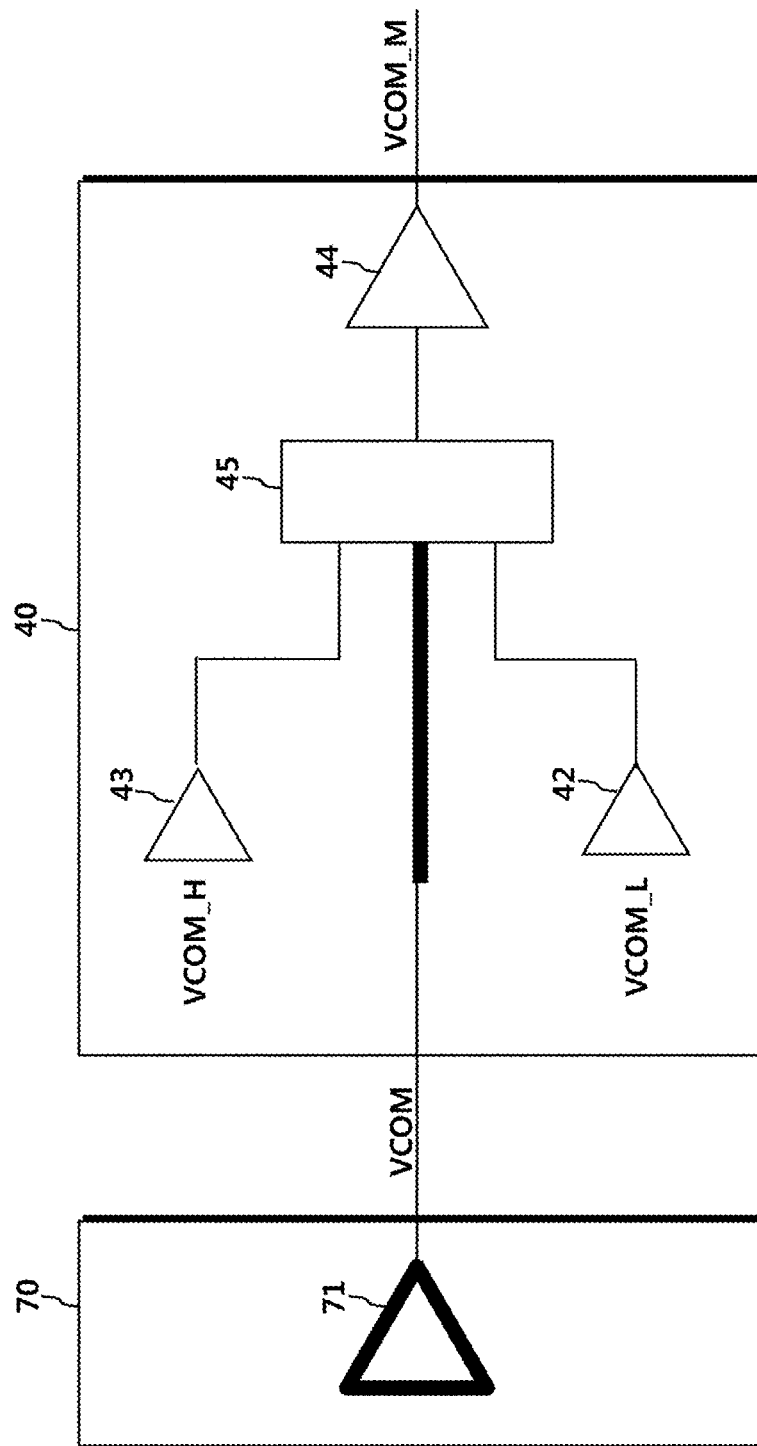
FIG. 7 is an exemplary diagram showing operations of a power management integrated circuit and a touch modulation integrated circuit.

FIG. 7 is an exemplary diagram showing operations of a power management integrated circuit and a touch modulation integrated circuit.

Referring to FIG. 7, conventionally, a display device may always consume the same amount of power regardless of the display operation or the touch sensing operation of internal circuits. This figure will describe, as an example, a case when a power management integrated circuit 70 supplies a common voltage VCOM to a touch modulation integrated circuit 40.

The power management integrated circuit 70 may comprise a first buffer 71. The touch modulation integrated circuit 40 may comprise a second buffer 42, a third buffer 43, a fourth buffer 44, and a selector 45.

The power management integrated circuit 70 may generate a common voltage VCOM and transmit the common voltage to the touch modulation integrated circuit 40. The common voltage VCOM may be outputted from the first buffer 71 of the power management integrated circuit 70 and inputted into the selector 45 of the touch modulation integrated circuit 40.

The touch modulation integrated circuit 40 may generate a driving voltage VCOM_M and transmit the driving voltage VCOM_M to an electrode, for example, a touch electrode. The driving voltage VCOM_M may be generated using a low driving voltage VCOM_L and a high driving voltage VCOM_H. A low driving voltage VCOM_L may be outputted from the second buffer 42 and inputted into the selector 45, and a high driving voltage VCOM_H may be outputted from the third buffer 43 and inputted into the selector 45. The selector 45 may generate a driving voltage VCOM_M by selecting one of a low driving voltage VCOM_L and a high driving voltage VCOM_H. The driving voltage VCOM_M may be transmitted to the electrode via the fourth buffer 44.

Conventionally, a power management integrated circuit 70 may generate a uniform level of common voltages VCOM during a display operation as well as a touch sensing operation of a display device and transmit them to a touch modulation integrated circuit 40. The touch modulation integrated circuit 40 may transmit a fixed level of common voltages VCOM or driving voltages VCOM_M to external components.

As described above, the power management integrated circuit 70 may generate common voltages VCOM having the same level during the display operation as well as the touch sensing operation. In this case, the power consumption of the power management integrated circuit 70 may be higher than that in the case when common voltages VCOM having a low level are generated during the touch sensing operation. In order to represent high power consumption, the first buffer 71 of the power management integrated circuit 70 and a line for common voltages VCOM are indicated by a thick line in this figure.

Figure 8:
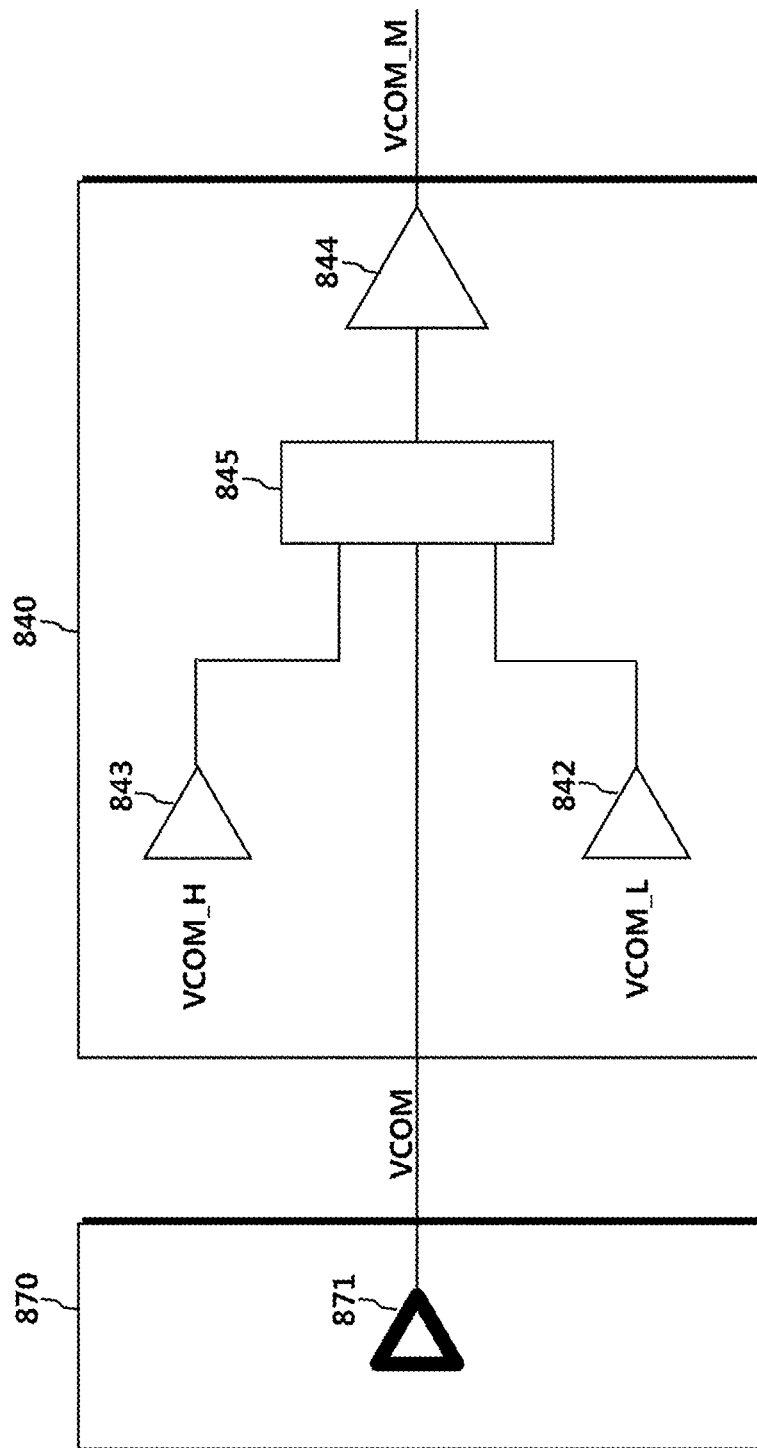
FIG. 8 is an exemplary diagram showing operations of a power management integrated circuit and a touch modulation integrated circuit according to an embodiment.

FIG. 8 is an exemplary diagram showing operations of a power management integrated circuit and a touch modulation integrated circuit according to an embodiment.

Referring to FIG. 8, a display device according to an embodiment may consume different power depending on a display operation or a touch sensing operation while operating. This figure illustrates a case when a power management integrated circuit 870 supplies a common voltage VCOM to a touch modulation integrated circuit 840 according to an embodiment.

The power management integrated circuit 870 may comprise a first buffer 871. The touch modulation integrated circuit 840 may comprise a second buffer 842, a third buffer 843, a fourth buffer 844, and a selector 845.

The power management integrated circuit 870 according to an embodiment may generate, in the touch sensing operation, a common voltage VCOM, having a level lower than a level of a common voltage VCOM in the display operation, and transmit the common voltage VCOM to the touch modulation integrated circuit 840. The touch modulation integrated circuit 840 may receive a low level of a common voltage VCOM in the touch sensing operation of the display device.

In this case, the power consumption of the power management integrated circuit 870 may be lower than that in the case when common voltages VCOM having the same level are generated regardless of the operations of the display device, which are the display operation and the touch sensing operation. In order to represent low power consumption, the first buffer 871 of the power management integrated circuit 870 is indicated to be relatively small.

Figure 9:
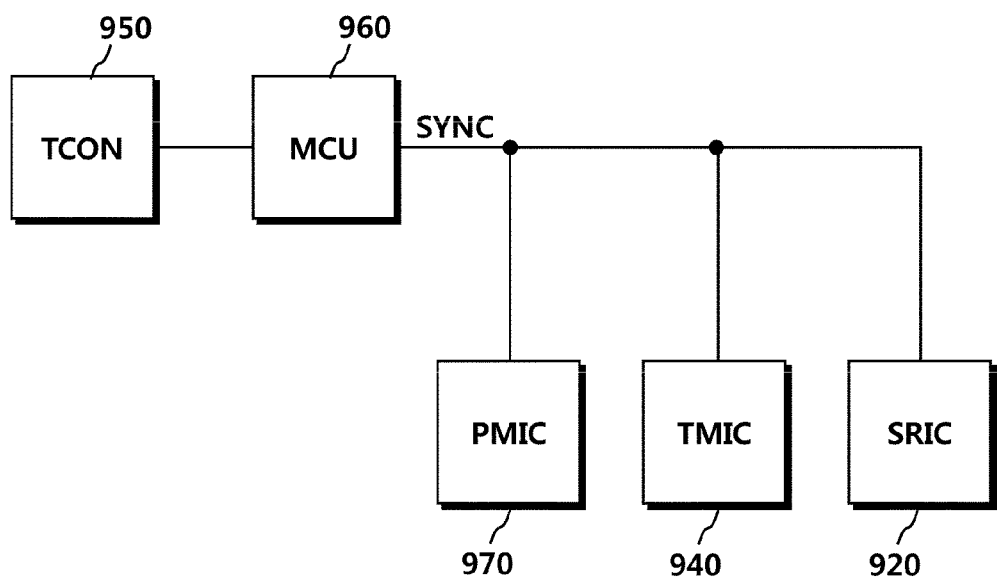
FIG. 9 is a configuration diagram of a display device according to another embodiment.

FIG. 9 is a configuration diagram of a display device according to another embodiment.

Referring to FIG. 9, a display device 900 may comprise a source readout integrated circuit 920, a touch modulation integrated circuit 940, a timing controller 950, a microcontroller 960, and a power management integrated circuit 970.

The timing controller 950 may be connected with the microcontroller 960 and send data to the microcontroller 960.

The microcontroller 960 may generate synchronization signals SYNC, for example a touch synchronization signal and a power synchronization signal, and transmit them to the source readout integrated circuit 920, the touch modulation integrated circuit 940, and the power management integrated circuit 970. Synchronization signals SYNC may be generated in the timing controller 950 or the microcontroller 960.

The source readout integrated circuit 920, the touch modulation integrated circuit 940, and the power management integrated circuit 970 may enter the standby mode and operate with low power according to a synchronization signal SYNC.

Display related circuits of the source readout integrated circuit 920, for example a source driver circuit, and display related circuits of the power management integrated circuit 970 may operate with low power in the touch sensing time section indicated by a touch synchronization signal or when a power synchronization signal is in a first level.

Touch sensing related circuits of the source readout integrated circuit 920, for example a readout circuit, touch sensing related circuits of the touch modulation integrated circuit 940 and the power management integrated circuit 970 may operate with low power in the display time section indicated by the touch synchronization signal or when the power synchronization signal is in a second level.

To sum up, a way that the display device 900 operates with low power is as follows. The timing controller 950 or the microcontroller 960 may generate a control signal, for example a synchronization signal, to control a first circuit for displaying image data and a second circuit for sensing a touch or the proximity of an external object to operate in the standby mode. Here, the first circuit may comprise display related circuits and the second circuit may comprise touch sensing related circuits. The timing controller 950 or the microcontroller 960 may transmit the control signal to the first circuit and the second circuit. The first circuit or the second circuit may operate with low power according to the control signal. The first circuit for displaying image data may operate in the standby mode while a touch or the proximity of an external object is sensed. The second circuit for sensing a touch or the proximity of an external object may operate in the standby mode while image data is displayed.

Figure 10:
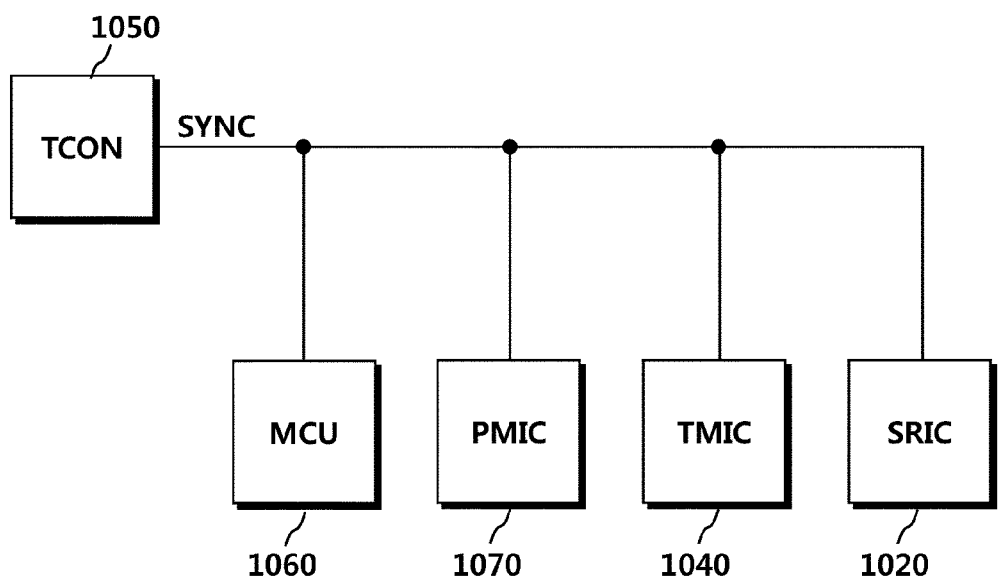
FIG. 10 is a configuration diagram of a display device according to still another embodiment.

FIG. 10 is a configuration diagram of a display device according to still another embodiment.

Referring to FIG. 10, a display device 1000 may comprise a source readout integrated circuit 1020, a touch modulation integrated circuit 1040, a timing controller 1050, a microcontroller 1060, and a power management integrated circuit 1070.

The timing controller 1050 may generate synchronization signals SYNC, for example a touch synchronization signal and a power synchronization signal, and transmit them to the source readout integrated circuit 1020, the touch modulation integrated circuit 1040, the microcontroller 1060, and the power management integrated circuit 1070. Synchronization signal SYNC may be generated in the timing controller 1050.

The source readout integrated circuit 1020, the touch modulation integrated circuit 1040, and the power management integrated circuit 1070 may enter the standby mode and operate with low power according to a synchronization signal SYNC.

Display related circuits of the source readout integrated circuit 1020, for example a source driver circuit, and display related circuits of the power management integrated circuit 1070 may operate with low power in the touch sensing time section indicated by a touch synchronization signal or when a power synchronization signal is in a first level.

Touch sensing related circuits of the source readout integrated circuit 1020, for example a readout circuit, touch sensing related circuits of the touch modulation integrated circuit 1040 and the power management integrated circuit 1070 may operate with low power in the display time section indicated by the touch synchronization signal or when the power synchronization signal is in a second level.

The microcontroller 1060 may operate in the normal mode regardless of the synchronization signal SYNC. The microcontroller 1060 may be involved in both the display operation and the touch sensing operation of the display device 1000.

Figure 11:
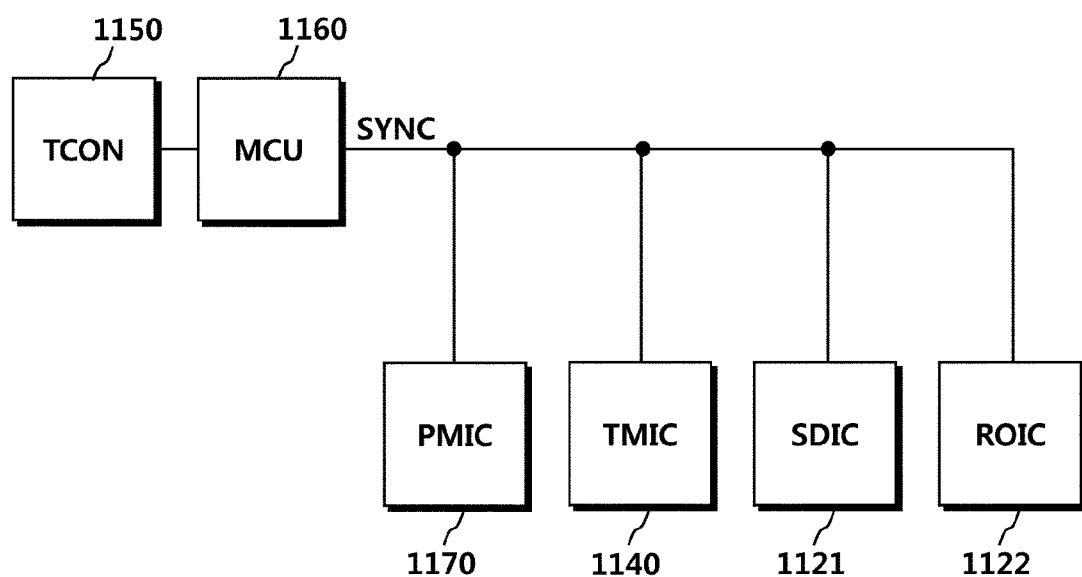
FIG. 11 is a configuration diagram of a display device according to still another embodiment.

FIG. 11 is a configuration diagram of a display device according to still another embodiment.

Referring to FIG. 11, a display device 1100 may comprise a source driver circuit 1121, a readout circuit 1122, a touch modulation integrated circuit 1140, a timing controller 1150, a microcontroller 1160, and a power management integrated circuit 1170.

The timing controller 1150 may be connected with the microcontroller 1160 and send data to the microcontroller 1160.

The microcontroller 1160 may generate synchronization signals SYNC, for example a touch synchronization signal and a power synchronization signal, and transmit them to the source driver circuit 1121, the readout circuit 1122, the touch modulation integrated circuit 1140, and the power management integrated circuit 1170. Synchronization signals SYNC may be generated in the timing controller 1150 or the microcontroller 1160.

The source driver circuit 1121, the readout circuit 1122, the touch modulation integrated circuit 1140, and the power management integrated circuit 1170 may enter the standby mode and operate with low power according to a synchronization signal SYNC.

Display related circuits of the source driver circuit 1121 and the power management integrated circuit 1170 may operate with low power in the touch sensing time section indicated by a touch synchronization signal or when a power synchronization signal is in a first level.

Touch sensing related circuits of the readout circuit 1122, the touch modulation integrated circuit 1140, and the power management integrated circuit 1170 may operate with low power in the display time section indicated by the touch synchronization signal or when the power synchronization signal is in a second level.

Figure 12:
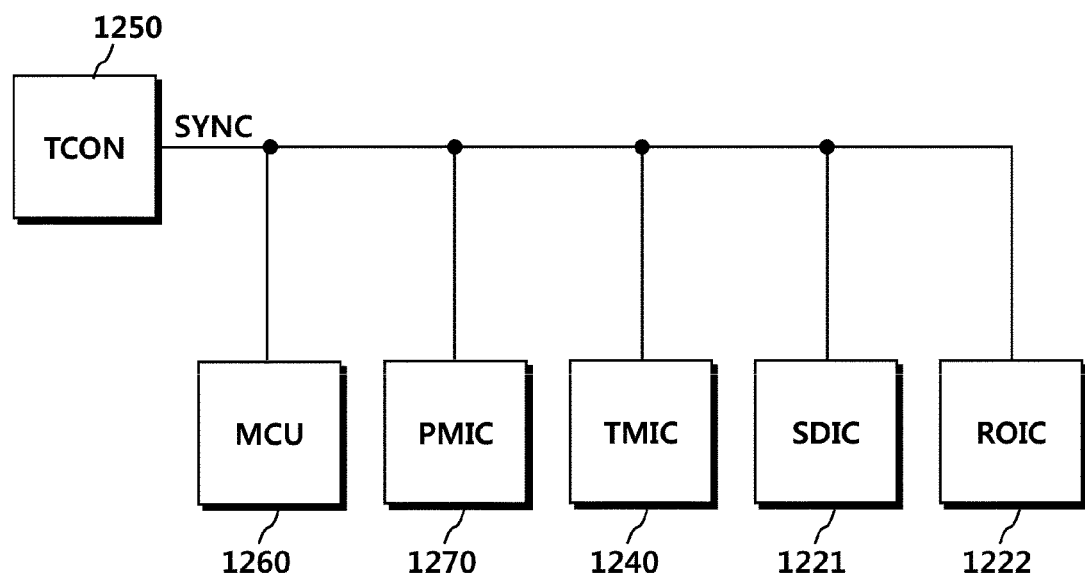
FIG. 12 is a configuration diagram of a display device according to still another embodiment.

FIG. 12 is a configuration diagram of a display device according to still another embodiment.

Referring to FIG. 12, a display device 1200 may comprise a source driver circuit 1221, a readout circuit 1222, a touch modulation integrated circuit 1240, a timing controller 1250, a microcontroller 1260, and a power management integrated circuit 1270.

The timing controller 1250 may generate synchronization signals SYNC, for example a touch synchronization signal and a power synchronization signal, and transmit them to the source driver circuit 1221, the readout circuit 1222, the touch modulation integrated circuit 1240, the microcontroller 1260, and the power management integrated circuit 1270. Synchronization signals SYNC may be generated in the timing controller 1250.

The source driver circuit 1221, the readout circuit 1222, the touch modulation integrated circuit 1240, the microcontroller 1260, and the power management integrated circuit 1270 may enter the standby mode and operate with low power according to a synchronization signal SYNC.

Display related circuits of the source driver circuit 1221 and the power management integrated circuit 1270 may operate with low power in the touch sensing time section indicated by a touch synchronization signal or when a power synchronization signal is in a first level.

Touch sensing related circuits of the readout circuit 1222, the touch modulation integrated circuit 1240, and the power management integrated circuit 1270 may operate with low power in the display time section indicated by the touch synchronization signal or when the power synchronization signal is in a second level.

The microcontroller 1260 may operate in the normal mode regardless of the synchronization signal SYNC. The microcontroller 1260 may be involved in both the display operation and the touch sensing operation of the display device 1200.

Figure 13:
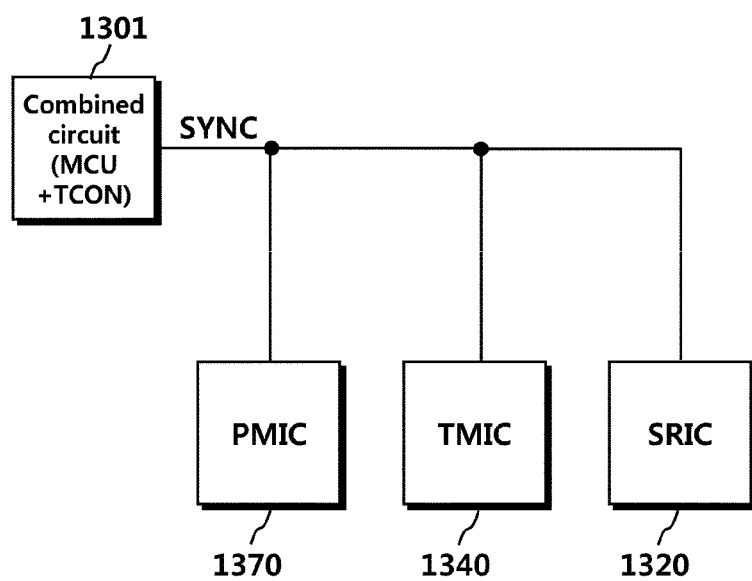
FIG. 13 is a configuration diagram of a display device according to still another embodiment.

FIG. 13 is a configuration diagram of a display device according to still another embodiment.

Referring to FIG. 13, a display device 1300 may comprise a source readout integrated circuit 1320, a touch modulation integrated circuit 1340, a power management integrated circuit 1370, and a first combined circuit 1301.

The first combined circuit 1301, in which a timing controller and a microcontroller are integrated in one circuit, may serve as both a timing controller and a microcontroller.

The first combined circuit 1301 may generate synchronization signals SYNC, for example a touch synchronization signal and a power synchronization signal, and transmit them to the source readout integrated circuit 1320, the touch modulation integrated circuit 1340, and the power management integrated circuit 1370. Synchronization signal SYNC may be generated in the first combined circuit 1301.

The source readout integrated circuit 1320, the touch modulation integrated circuit 1340, and the power management integrated circuit 1370 may enter the standby mode and operate with low power according to a synchronization signal SYNC.

Display related circuits of the source readout integrated circuit 1320, for example a source driver circuit, and display related circuits of the power management integrated circuit 1370 may operate with low power in the touch sensing time section indicated by a touch synchronization signal or when a power synchronization signal is in a first level.

Touch sensing related circuits of the source readout integrated circuit 1320, for example a readout circuit, and touch sensing related circuits of the touch modulation integrated circuit 1340 and the power management integrated circuit 1370 may operate with low power in the display time section indicated by the touch synchronization signal or when the power synchronization signal is in a second level.

Figure 14:
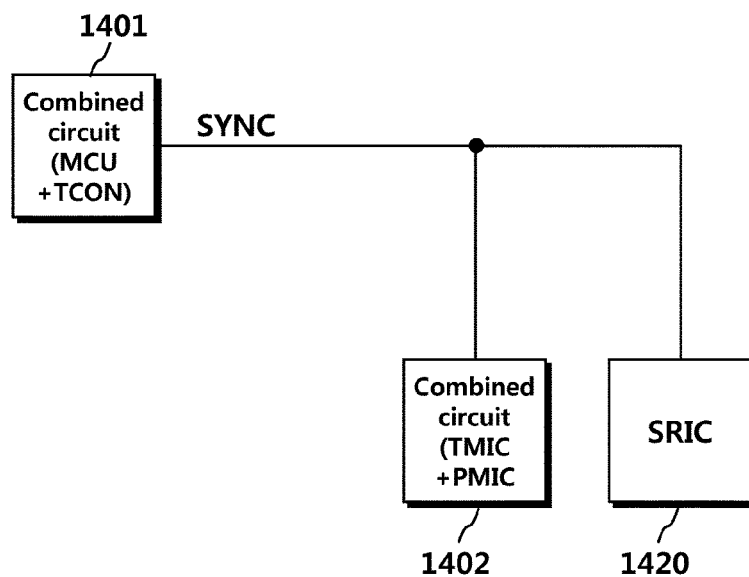
FIG. 14 is a configuration diagram of a display device according to still another embodiment.

FIG. 14 is a configuration diagram of a display device according to still another embodiment.

Referring to FIG. 14, a display device 1400 may comprise a source readout integrated circuit 1420, a first combined circuit 1401, and a second combined circuit 1402.

The first combined circuit 1401, in which a timing controller and a microcontroller are integrated in one circuit, may serve as both a timing controller and a microcontroller.

The second combined circuit 1402, in which a touch modulation integrated circuit and a power management integrated circuit are integrated in one circuit, may serve as both a touch modulation integrated circuit and a power management integrated circuit.

The first combined circuit 1401 may generate synchronization signals SYNC, for example a touch synchronization signal and a power synchronization signal, and transmit them to the source readout integrated circuit 1420 and the second combined circuit 1402. Synchronization signal SYNC may be generated in the first combined circuit 1401.

The source readout integrated circuit 1420 and the second combined circuit 1402 may enter the standby mode and operate with low power according to a synchronization signal SYNC.

Display related circuits of the source readout integrated circuit 1420, for example a source driver circuit, and display related circuits of the second combined circuit 1402 may operate with low power in the touch sensing time section indicated by a touch synchronization signal or when a power synchronization signal is in a first level. Here, the display related circuit of the second combined circuit 1402 may correspond to display related circuits of a power management integrated circuit.

Touch sensing related circuits of the source readout integrated circuit 1420, for example a readout circuit, and touch sensing related circuits of the second combined circuit 1402 may operate with low power in the display time section indicated by the touch synchronization signal or when the power synchronization signal is in a second level. Here, touch sensing related circuits of the second combined circuit 1402 may correspond to touch sensing related circuits of a touch modulation integrated circuit and a power management integrated circuit.

What is claimed is:

1. A method for processing a synchronization signal in a first integrated circuit, the method comprising:
generating a first synchronization signal as a touch synchronization signal that is divided into a display period set for displaying image data and a touch period set for a touch sensing operation; and
transmitting the first synchronization signal to a second integrated circuit which is included in a source readout integrated circuit, wherein
a first portion of the second integrated circuit is configured to operate in a low power mode during a touch period based on the first synchronization signal, and
a second portion of the second integrated circuit is configured to operate in the low power during a display period based on the first synchronization signal.

2. The method of claim 1, wherein the first integrated circuit comprises a microcontroller or a timing controller.

3. The method of claim 1, further comprising:
generating a second synchronization signal as a power synchronization signal that is different from the first synchronization signal; and
transmitting the second synchronization signal to the second integrated circuit, wherein
the second portion of the second integrated circuit is configured to operate in the low power mode during the touch period based on the second synchronization signal, and a standby mode period based on the second synchronization signal is longer than the touch period based on the first synchronization signal.

4. The method of claim 1, wherein a shared voltage is commonly used in the first portion of the second integrated circuit and the second portion of the second integrated circuit, and wherein the shared voltage comprises a first voltage level during the touch period and a second voltage level that is different from the first voltage level during the display period.

5. The method of claim 4, wherein the second voltage level is greater than the first voltage level.

6. An integrated circuit comprising:
a first circuit configured to display image data; and
a second circuit configured to sense a touch or a proximity of an external object, wherein
the first circuit is configured to operate in a low power mode while the touch or the proximity of the external object is sensed,
the second circuit is configured to operate in the low power mode while the image data is displayed,
the integrated circuit is configured to receive a signal of a shared voltage which is commonly used in the first circuit and the second circuit from an external circuit,
the shared voltage comprises a first voltage level while the touch or the proximity of the external object is sensed by the second circuit, and a second voltage level that is different from the first voltage level while the image data is displayed by the first circuit,
the integrated circuit is configured to receive a control signal from a control circuit, the control signal controlling low power operations of the first circuit and the second circuit, and
the control signal comprises a touch synchronization signal that indicates a first time section where the image data is displayed on a panel and a second time section where the touch or the proximity of the external object is sensed.

7. The integrated circuit of claim 6, wherein the second voltage level is greater than the first voltage level.

8. The integrated circuit of claim 6, wherein the first circuit is configured to operate in the low power mode in the second time section and the second circuit is configured to operate in the low power mode in the first time section based on the touch synchronization signal.

9. The integrated circuit of claim 8, wherein the control signal comprises a power synchronization signal that indicates the low power operations of the first circuit and the second circuit.

10. The integrated circuit of claim 9, wherein the power synchronization signal is generated separately from the touch synchronization signal and indicates timings different from timings indicated by the touch synchronization signal.

11. The integrated circuit of claim 6, wherein the first circuit and the second circuit are included in a source readout integrated circuit.

12. The integrated circuit of claim 6, wherein the external circuit is included in a power management integrated circuit or a touch modulation integrated circuit, and wherein the control circuit is included in a microcontroller, a timing controller, a microcontroller or a timing controller.

13. A method for controlling power in a touch modulation integrated circuit, the method comprising:
receiving a first synchronization signal as a touch synchronization signal;

receiving a second synchronization signal as a power synchronization signal that is different from the first synchronization signal; and outputting a common voltage signal for sensing a touch or a proximity of an external object during a touch period set for touch sensing operation, based on the first synchronization signal, wherein the touch modulation integrated circuit is configured to operate in a low power mode during the touch period based on the second synchronization signal, and the touch modulation integrated circuit is configured to receive the second synchronization signal from at least one of a microcontroller or a timing controller.

14. The method of claim 13, further comprising:

outputting the common voltage signal for displaying image data during a display period set for display operation, based on the first synchronization signal.

15. The method of claim 14, wherein the touch modulation integrated circuit is configured to operate in the low power mode during the display period, based on the second synchronization signal.

16. The method of claim 13, wherein the touch modulation integrated circuit is configured to control a touch sensing related circuit from among circuits of the touch modulation integrated circuit to reduce power in the low power mode.

* * * * *